United States Patent [19]

Kosinski

[11] Patent Number: 5,059,644

[45] Date of Patent: Oct. 22, 1991

[54] POLYACETAL COMPOSITIONS CONTAINING AT LEAST ONE OXO-PIPERAZINYLTRIAZINE HINDERED AMINE LIGHT STABILIZER

[75] Inventor: Leonard E. R. Kosinski, Washington, W. Va.

[73] Assignee: E. I. du Pont de Nemours and Company, Wilmington, Del.

[21] Appl. No.: 495,665

[22] Filed: Mar. 19, 1990

[51] Int. Cl.$^5$ ............................................. C08K 5/3492
[52] U.S. Cl. ..................................... 524/100; 524/91; 524/222; 524/239; 524/321; 524/359; 524/596; 524/494
[58] Field of Search ................ 524/100, 91, 222, 239, 524/321, 359, 494, 596

[56] References Cited

U.S. PATENT DOCUMENTS

| | | | |
|---|---|---|---|
| 4,190,571 | 2/1980 | Lai et al. | 260/45.8 N |
| 4,292,240 | 9/1981 | Lai et al. | 260/239.3 R |
| 4,298,737 | 11/1981 | Lai et al. | 544/360 |
| 4,480,092 | 10/1984 | Lai et al. | 544/113 |
| 4,547,538 | 10/1985 | Lai et al. | 524/100 |
| 4,753,979 | 6/1988 | Conetta et al. | 524/100 |
| 4,816,507 | 3/1989 | Cantatore et al. | 524/100 |

FOREIGN PATENT DOCUMENTS 0299426 1/1989 European Pat. Off. .

*Primary Examiner*—Kriellion S. Morgan

[57] ABSTRACT

Polyacetal compositions containing 0.05 to 5 weight percent of an oxo-piperazinyl-triazine hindered amine light stabilizer wherein the hindered $N^4$ atom in the piperazinone ring of the stabilizer is alkylated with a metyl, ethyl, or propyl group, said compositions being relatively stable upon exposure to UV light. A polyacetal composition containing a specific oxo-piperazinyl-triazine hindered amine light stabilizer wherein the hindered $N^4$ atom is not alkylated is shown to be relatively stable upon exposure to UV light. Both compositions possess stability during melt processing and do not significantly lose physical properties upon exposure to heat and light.

13 Claims, No Drawings

POLYACETAL COMPOSITIONS CONTAINING AT LEAST ONE OXO-PIPERAZINYLTRIAZINE HINDERED AMINE LIGHT STABILIZER

BACKGROUND OF THE INVENTION

1. Technical Field

This invention relates to certain polyacetal compositions containing at least one oxo-piperazinyl-triazine hindered amine light stabilizer, said compositions being characterized as having good stability upon exposure to light. Further, and most surprisingly, certain other properties, such as melt processing stability and retention of physical properties upon exposure to heat and light, possessed by a polyacetal polymer are not significantly sacrificed when the oxo-piperazinyl-triazine hindered amine light stabilizer of the present invention is incorporated therein.

Hereinafter, the term "hindered amine light stabilizer" shall be referred to as "HALS". The term "oxo-piperazinyl-triazine" shall be referred to as "PIP-T" for brevity. The triazine ring will usually have three polysubstituted piperazine-2-one ("PSP") substituents, each distally spaced apart from each carbon atom of the triazine ring by a polyalkyleneamine bridge.

Polyacetal, also commonly referred to as polyoxymethylene, compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high molecular weight, i.e., 10,000 to 100,000 are useful in preparing semi-finished and finished articles by any of the techniques commonly used with thermoplastic materials, e.g. compression molding, injection molding, extrusion, blow molding, rotational molding, melt spinning, stamping and thermoforming. Finished articles made from such compositions possess desirable physical properties, including high stiffness, strength, low coefficient of friction, and good solvent resistance.

In some applications, polyacetal compositions are exposed to light for long periods of time. It is desired that said polyacetal compositions remain relatively stable upon exposure to light for such periods of time. The stability of a polyacetal composition upon exposure to light can be measured by the weight loss it experiences upon exposure to UV light and/or its color fastness. To impart or improve light stability to a polyacetal composition, HALS may be added to the polyacetal compositions. However, it is not uncommon that the addition of such HALS can adversely affect other properties of the polyacetal composition, such as the melt processing stability (e.g., gaseous formation evolution or discoloration during melt processing) of said composition and/or the retention of the physical properties of said composition upon exposure to heat and air.

It has been found, in the present invention, that the inclusion of certain PIP-T HALS into a polyacetal results in a polyacetal composition having good stability upon exposure to light, as measured by weight loss upon exposure to UV light and/or color fastness. Further, it has been found that the inclusion of these certain PIP-T HALS into polyacetal does not significantly adversely affect the other properties, such as the melt processing stability and the retention of physical properties upon exposure to heat and air of the polyacetal composition.

The specific PIP-T HALS useful in the compositions of the present invention are a known compound and more preferably, an alkylated derivative of a compound similar to the known compound.

The known compound is specifically disclosed in U.S. Pat. No. 4,547,538 and European Patent Application 0 299 426 and it has the following structure (I):

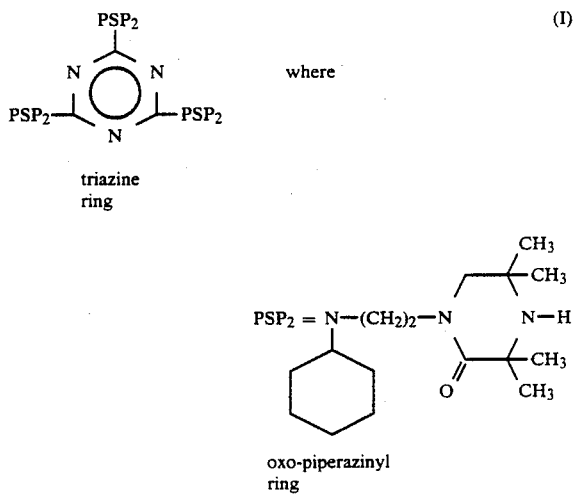

The nitrogen in the piperazinone ring of the oxo-piperazinyl ring to which the hydrogen (—H) is attached is hereinafter referred to as the hindered $N^4$ atom. The hindered $N^4$ atom of (I) is of secondary amine functionality. Structure (I) is hereinafter referred to as the unalkylated secondary amine PIP-T HALS (I).

The preferred PIP-T HALS is a derivative of a compound similar to the known compound (I) and it has the following structure (II):

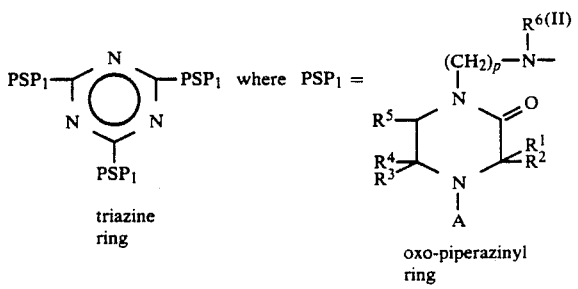

where A=methyl, ethyl, or propyl, preferably methyl; $R^1$, $R^2$, $R^3$, and $R^4$ each independently represent $C_1$–$C_6$ alkyl, or, when together cyclized, $R^1$ and $R^2$, and $R^3$ with $R^4$, represent $C_5$–$C_7$ cycloalkyl; $R^5$ represents $C_1$–$C_6$ alkyl, $C_5$–$C_7$ cycloalkyl, $C_7$–$C_{12}$ aralkyl, hydrogen and phenyl; $R^6$ represents $C_1$–$C_{12}$ alkyl and $C_5$–$C_{12}$ cycloalkyl; and p represents an integer in the range from 2 to about 12. The nitrogen in the piperazinone ring of the oxo-piperidinyl ring to which the —A substituent is attached is the hindered $N^4$ atom, as in (I), above. The hindered $N^4$ atom is alkylated and it is of tertiary amine functionality. Structure (II) is hereinafter referred to as the alkylated tertiary amine PIP-T HALS (II).

Although it is stated in U.S. Pat. No. 4,547,538 that the unalkylated secondary amine PIP-T HALS (I) can be incorporated into any of several organic materials, polymers included, polyacetal is not specifically disclosed as being a material into which this compound can be incorporated. Further, it is not necessarily true that compounds that are effective (or not effective) in most other polymers will also be effective (or not effective) in polyacetal. Part of this reason for this phenomenon is that polyacetal, when melt processed, gives rise to formaldehyde evolution. A compound incorporated into a polyacetal may adversely react with the formaldehyde that is evolved during the melt processing of the polyacetal and thereby may not be effective in the polyacetal even though it is effective in other polymers in which formaldehyde is not evolved during melt processing. Further, the compound may be effective for its particular purpose in polyacetal but, if it reacts with the evolved formaldehyde, it may have a significant adverse effect on the other properties of the polyacetal, thereby rendering it an undesirable compound for inclusion into polyacetal. In contrast, it is also true that a compound not effective in most other polymers may be effective in polyacetal because it reacts in a positive way with the formaldehyde evolved during melt processing. Still another reason for this phenomenon is that polyacetal may be more sensitive to impurities, such as excess acid or base, in the compound and as such, the compound may not be as effective in polyacetal as it would be in other polymers.

As such, even though a compound may be useful in most polymers, if the compound is likely to react adversely with the formaldehyde evolved during the melt processing of the polyacetal and/or if it has an undesirable level of impurities in it, then one skilled in the art of polyacetal chemistry would not expect the compound to be effective in polyacetal. The unalkylated secondary amine PIP-T HALS (I) of the present invention is, at its name implies, a secondary amine. Secondary amines are known to react with formaldehyde, thereby causing discoloration and/or destabilization in polyacetal during melt processing. The effect of secondary amine HALS on polyacetal during melt processing in shown by the Examples herein. However, with the unalkylated secondary amine PIP-T HALS (I) of the present invention, which imparts improved light stability to polyacetal, it was unexpectedly discovered that the discoloration and destabilization experienced by the polyacetal compositions during melt processing is reduced in comparison to the discoloration and destabilization experienced by polyacetal compositions containing other unalkylated secondary amine HALS, provided that the unalkylated secondary amine PIP-T HALS (I) is of proper pH.

Although polyacetal compositions can be effectively stabilized against light degradation (without significantly sacrificing other properties) with the unalkylated secondary amine PIP-T HALS (I), it was surprisingly found that the alkylated tertiary amine PIP-T HALS (II) is even more effective in stabilizing polyacetal compositions against light degradation, without significantly adversely affecting certain other properties, such as melt processing stability and retention of physical properties upon exposure to heat and light, of the polyacetal. It was not expected that polyacetal compositions containing the alkylated tertiary amine PIP-T HALS (II) would possess, on average, better properties than polyacetal compositions containing the unalkylated secondary amine PIP-T HALS (I). Further, it was also unexpectedly found that polyacetal compositions containing the alkylated tertiary amine PIP-T HALS (II) had better properties, on average, than an alkylated tertiary piperidine-s-triazine HALS. As such, even though the unalkylated secondary PIP-T HALS (I) was known and even though alkylated tertiary piperidine-s-triazine HALS were known, the superior results obtained, on average, with the alkylated tertiary amine PIP-T HALS (II) of the present invention were unexpected.

This invention, in summary, is specifically related to polyacetal compositions containing the alkylated tertiary amine PIP-T HALS (II), which is most preferred, or the unalkylated secondary amine PIP-T HALS (I) having the proper pH, said compositions having good stability upon exposure to light in the absence of a significant loss of melt processing stability and retention of physical properties.

BACKGROUND ART

U.S. Pat. No. 4,547,538 and European Patent Application 0 299 426 disclose structure (I), above. Structure (I) is disclosed as

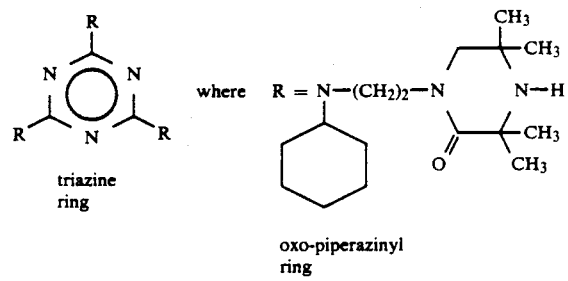

The compound is disclosed as being useful for stabilizing organic materials against ultra violet light degradation. Polyacetal is not specifically mentioned as such an organic material.

Techniques for substituting off an atom at least similar to the hindered $N^4$ atom of (I) are disclosed in U.S. Pat. Nos. 4,753,979 and 4,190,571. Although techniques for substituting off the hindered $N^4$ atoms existed in the art, there was no indication that the product resulting from alkylation of a structure similar to (II), when incorporated into polyacetal, would yield a polyacetal composition having improved light stability in the absence of a significant loss of other polyacetal properties.

U.S. Pat. No. 4,547,548 discloses polycondensation compounds containing piperidine and triazine groups for use as anti-actinic stabilizers for incorporation into polymeric materials. There is no recognition that use of a polycondensation compound, wherein the $N^4$ atom in the piperidine ring is alkylated, in polyacetal results in a polyacetal with properties that are improved over those polyacetal compositions containing a polycondensation compound wherein the $N^4$ atom in the piperidine ring is unalkylated (i.e., is of secondary amine functionality.

SUMMARY OF THE INVENTION

The present invention relates to polyacetal compositions containing (a) 95.0 to 99.95 weight percent of a polyacetal polymer and (b) 0.05 to 5.0 weight percent of an alkylated tertiary amine PIP-T HALS having the structure

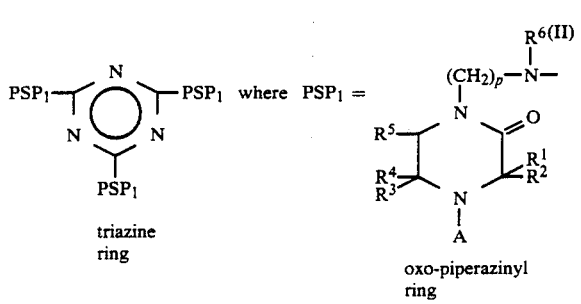

triazine ring oxo-piperazinyl ring where A=methyl, ethyl, or propyl, preferably methyl; $R^1$, $R^2$, $R^3$, and $R^4$ each independently represent $C_1$-$C_6$ alkyl, or, when together cyclized, $R^1$ and $R^2$, and $R^3$ with $R^4$, represent $C_5$-$C_7$ cycloalkyl; $R^5$ represents $C_1$-$C_6$ alkyl, $C_5$-$C_7$ cycloalkyl, $C_7$-$C_{12}$ aralkyl, and phenyl; $R^6$ represents $C_1$-$C_{12}$ alkyl and $C_5$-$C_{12}$ cycloalkyl; and p represents an integer in the range from 2 to about 12, and wherein the above-stated weight percents are based upon the weight of components (a) and (b) only and provided the pH of an aqueous suspension of component (b) is in the range of 5-10 for polyacetal copolymer and 5-8 for polyacetal homopolymer.

Although the preceding composition is most preferred, the present invention also relates to polyacetal compositions containing (a) 95.0 to 99.95 weight percent of a polyacetal polymer and (c) 0.05 to 5.0 weight percent of an unalkylated secondary amine PIP-T HALS having the structure

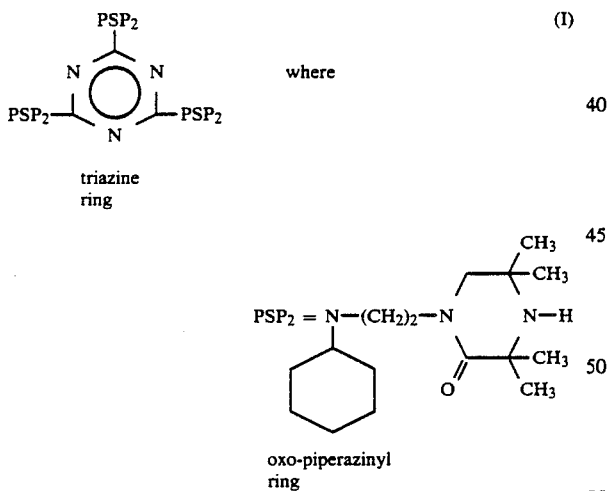

triazine ring oxo-piperazinyl ring wherein the above-stated weight percents are based upon the weight of components (a) and (c) only and provided the pH of an aqueous suspension of the component (c) is between 5-10 for copolymer polyacetal and 5-8 for homopolymer polyacetal.

The compositions of the present invention possess good light stability and do not suffer a significant loss of certain other properties inherent in the polyacetal, such as melt processing stability and/or retention of physical properties upon exposure to heat and light, when the hindered amine light stabilizer compound is incorporated therein.

DETAILED DESCRIPTION OF THE INVENTION

This invention relates to certain polyacetal compositions characterized as having good stability upon exposure to light, said compositions also not suffering a significant loss in the melt processing stability of polyacetal or the retention of physical properties upon exposure to heat and air.

More specifically, the preferred embodiment of this invention relates to polyacetal compositions light stabilized with the alkylated tertiary amine PIP-T HALS (II) having the structure

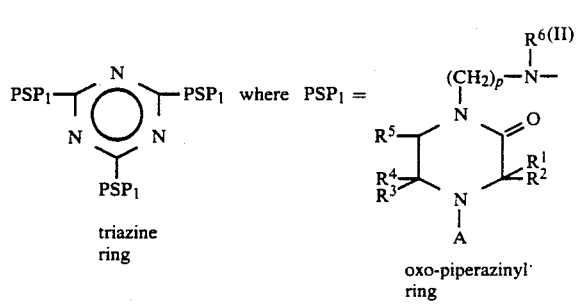

triazine ring oxo-piperazinyl ring where A=methyl, ethyl, or propyl, preferably methyl; $R^1$, $R^2$, $R^3$, and $R^4$ each independently represent $C_1$-$C_6$ alkyl, or, when together cyclized, $R^1$ and $R^2$, and $R^3$ with $R^4$, represent $C_5$-$C_7$ cycloalkyl; $R^5$ represents $C_1$-$C_6$ alkyl, $C_5$-$C_7$ cycloalkyl, $C_7$-$C_{12}$ aralkyl, hydrogen and phenyl; $R^6$ represents $C_1$-$C_{12}$ alkyl and $C_5$-$C_{12}$ cycloalkyl; and p represents an integer in the range from 2 to about 12.

This invention also relates to polyacetal compositions light stabilized with the unalkylated secondary amine PIP-T HALS (I) having structure

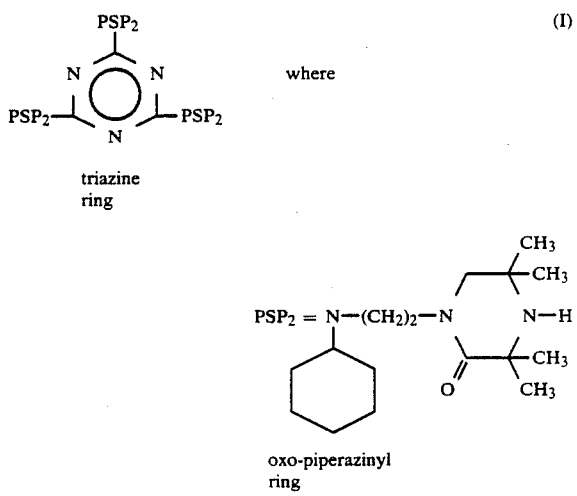

triazine ring oxo-piperazinyl ring and wherein the pH of an aqueous suspension of the component (c) is within the range described below.

THE COMPOSITIONS

The preferred composition of the present invention consists essentially of (a) 95.0 to 99.95 weight percent of a polyacetal polymer and (b) 0.05 to 5.0 weight percent of an alkylated tertiary amine PIP-T HALS with the structure (II)

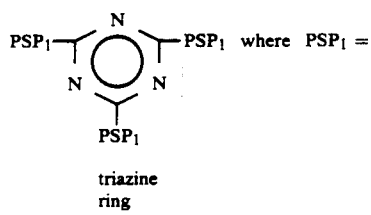
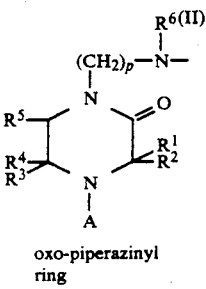

where A=methyl, ethyl, or propyl, preferably methyl; $R^1$, $R^2$, $R^3$, and $R^4$ each independently represent $C_1$–$C_6$ alkyl, or, when together cyclized, $R^1$ and $R^2$, and $R^3$ with $R^4$, represent $C_5$–$C_7$ cycloalkyl; $R^5$ represents $C_1$–$C_6$ alkyl, $C_5$–$C_7$ cycloalkyl, $C_7$–$C_{12}$ aralkyl, hydrogen and phenyl; $R^6$ represents $C_1$–$C_{12}$ alkyl and $C_5$–$C_{12}$ cycloalkyl; and p represents an integer in the range from 2 to about 12. Preferably, this composition consists essentially of 96.5 to 99.95 weight percent component (a) and 0.05 to 3.5 weight percent component (b). More preferably, this composition consists essentially of 98.0 to 99.95 weight percent (a) and 0.05 to 2.0 weight percent component (b). All the above weight percents are based upon the amount of component (a) and (b) only.

Another composition of the present invention consists essentially of (a) 95.0 to 99.95 weight percent of a polyacetal polymer and (c) 0.05 to 5.0 weight percent of an unalkylated secondary amine PIP-T HALS with the structure (I)

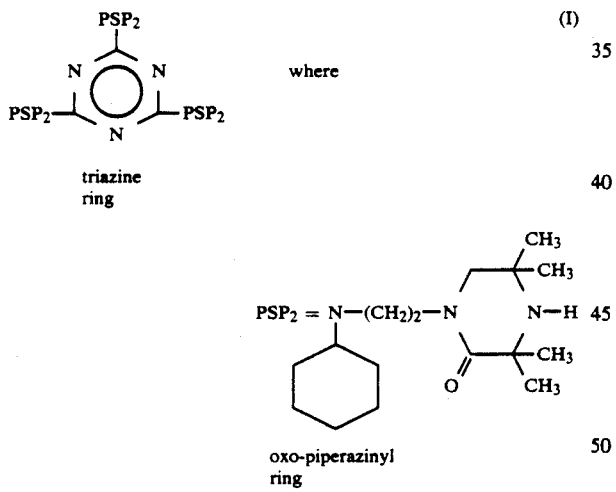

Preferably, the composition consists essentially of 96.5 to 99.95 weight percent component (a) and 0.05 to 3.5 weight percent component (c). More preferably, the composition consists essentially of 98.0 to 99.95 weight percent component (a) and 0.05 to 2.0 weight percent component (c). All the above weight percents are based upon the amount of components (a) and (c) only. Further, the pH of an aqueous suspension of the component (c) should be within the range described below.

COMPONENT (A). POLYACETAL

The term "polyacetal" as used herein includes homopolymers of formaldehyde or of cyclic oligomers of formaldehyde, the terminal groups of which are end-capped by esterification of etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness. Preferred polyacetal homopolymers include those whose terminal hydroxyl groups have been end-capped by a chemical reaction to form ester or ether groups, preferably acetate or methoxy groups, respectively.

COMPONENT (B). ALKYLATED TERTIARY AMINE PIP-T HALS (II)

The preferred polyacetal composition of the present invention incorporates therein component (b), which is the alkylated tertiary amine PIP-T HALS (II), above. The most preferred composition is one wherein the component (b) incorporated into the polyacetal is alkylated with a methyl group.

The component (b) alkylated tertiary amine PIP-T HALS (II) is an alkylated derivative of a known unalkylated PIP-T HALS which consists of a triazine ring having three polysubstituted piperazin-2-one "PSP") substituents, each distally spaced apart from each C atom of the triazine ring by a polyalkyleneamine bridge. As background information, the general structure of a PIP-T is disclosed in U.S. Pat. No. 4,480,092 to Lai et al (class 544/subclass 113), the disclosure of which is incorporated by reference thereto as if fully set forth herein. Background information on PSP compounds is provided in U.S. Pat. Nos. 4,190,571; 4,292,240; and 4,298,737 inter alia.

The structure of the known unalkylated PIP-T HALS is represented by structure (III), as follows:

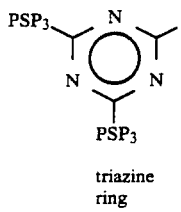 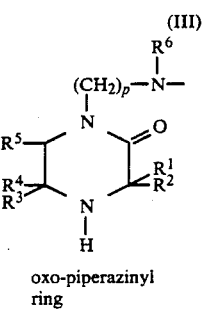

PSP₃—N—N—PSP₃ where PSP₃ = (oxo-piperazinyl ring structure)

triazine ring    oxo-piperazinyl ring where $R^1$, $R^2$, $R^3$, and $R^4$ each independently represent $C_1$–$C_6$ alkyl, or, when together cyclized, $R^1$ and $R^2$, and $R^3$ with $R^4$, represent $C_5$–$C_7$ cycloalkyl; $R^5$ represents $C_1$–$C_6$ alkyl, $C_5$–$C_7$ cycloalkyl, $C_7$–$C_{12}$ aralkyl, hydrogen and phenyl; $R^6$ represents $C_1$–$C_{12}$ alkyl and $C_5$–$C_{12}$ cycloalkyl; and p represents an integer in the range from 2 to about 12.

When polyacetal compositions contain an essentially pure PIP-T HALS (III) alkylated with a methyl, ethyl, or propyl group at the hindered $N^4$ position of the piperazinone ring of the oxo-piperazinyl ring, the compositions are, as stated previously, stabilized more effectively than if said compositions contained either an unmethylated PIP-T HALS (such as structures (I) or (III), above) or other known methylated piperidyl-triazine HALS. By the term "essentially pure", it is meant that the alkylated tertiary amine is 90% pure and preferably 95% pure and that it further meets the purity requirements detailed below for compounds or additives added to polyacetal compositions.

A method for preparing an essentially pure alkylated tertiary amine PIP-T HALS (II) component (b) of the present invention is described below specifically for the case where the $N^4$ atom in the piperazinone ring is alkylated with a methyl group, which is most preferred. In step (a), where an alkyleneamine is used, the process is described with the preferred alkyleneamine, which is an ethyleneamine. From this description, one skilled in the art could readily determine a process for alkylating said $N^4$ atom with an ethyl group or a propyl group.

The essentially pure alkylated tertiary amine PIP-T HALS (II) component (b) of the present invention can be prepared from readily available compounds by (a) reacting an ethylenediamine with an aliphatic or cycloaliphatic aldehyde, and a nitroalkane or nitrocycloalkane at a temperature in the range from about ambient temperature (20° to about 60° C.), and pressure in the range from atmospheric to superatmospheric pressure up to about 100 psig to produce a reaction mixture containing a nitroamine (IV);

(b) without separating the reaction mixture, contacting the reaction mixture with molecular hydrogen at a pressure in the range from about 100 psig to about 1000 psig at a temperature in the range from about ambient temperature to about 120° C. in the presence of a Group VIII metal catalyst to produce a triamine (V);

(c) reductively alkylating the triamine at only the terminal primary amine group of the alkyleneamine, ethyleneamine moiety to provide a N-substituted-N'-substituted-1,2-ethanediamine (VI);

(d) subjecting (VI) to a ketoform reaction to produce a $N^1$-substituted PSP (VII);

(e) reacting cyanuric chloride with at least 3 moles of (VII) to produce the PIP-T (III);

(f) reacting a solution of (III) in an aromatic solvent in the presence of an excess of formic acid and formaldehyde to produce methylated PIP-T; and, (g) recovering essentially pure crystals of the PIP-T from the reaction mass.

The methylated tertiary amine PIP-T HALS produced by this process is the most preferred PIP-T HALS for use in the polyacetal compositions of the present invention.

The above steps are described in more detail below.

Because it is essential to provide a connecting bridge between the triazine ring and the oxo-piperazinone ring, the starting materials for preparing the PIP-T are an alkylenediamine, preferably, ethyleneamine, an aldehyde $R^5CHO$, and an appropriately substituted nitroalkane or nitrocycloalkane. As will be evident, the $R^5$ substituent is preserved on the 6-C atom of the PSP to be formed in the alkylated tertiary amine PIP-T HALS component (b). Typically no substituent at the 6-C atom is provided, because formaldehyde or paraformaldehyde are used. To provide dimethyl substituents on the 5-C atom of the PSP, the starting nitroalkane is 2-nitropropane; and to provide a cyclohexyl group at the 5-C atom, nitrocyclohexane is used.

Particular starting materials are an alkylenediamine, preferably ethylenediamine, formaldehyde, nitropropane; the triamine formed is reductively alkylated with cyclohexanone.

Thus, in the preparation of a 3,3,5,5,6-pentasubstituted piperazinone substituent for the PIP-T with the desired $N^4$ substituent to provide the bridge, the first step is the preparation of a triamine with terminal primary amine groups. Since an ethyleneamine bridge is generally adequate, the first step is as follows:

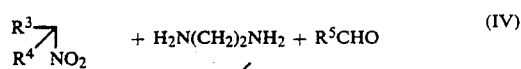

(IV)

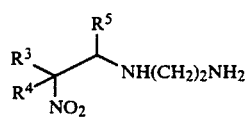

namely, N-(2-nitro-disubstituted)-1,2-ethanediamine, which is hydrogenated over Raney Ni to yield

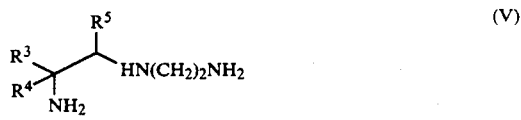

(V)

When starting with ethylenediamine, 2-nitropropane and paraformaldehyde the compound obtained is N-(2-methyl-1-2-nitropropyl)-1,2-ethanediamine which when hydrogenated yields N-(2-amino-2-methylpropyl)-1,2-propanediamine

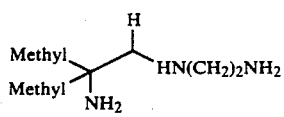

This triamine with terminal primary amine groups is then reductively alkylated with a ketone, for example cyclohexanone to yield N-cyclohexyl-N'-(2-amino-2-methylpropyl)-1,2-ethanediamine

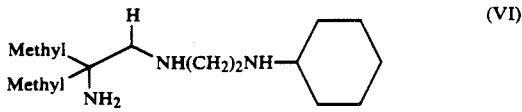
(VI)

This N-substituted 1,2-ethanediamine is subjected to a ketoform reaction using the appropriate ketone to provide the desired $R^2$ and $R^3$ substituents on the PSP in structure (II), and chloroform in the presence of sodium hydroxide to produce the PSP4 substituent. To provide dimethyl substituents on the 3-C atom, acetone is used. The illustrative PSP4 formed is represented as

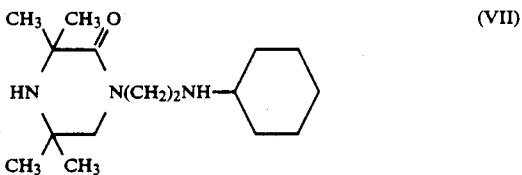
(VII)

This PSP4, or other PSP with the desired substituents on the ring, is then reacted with cyanuric chloride to yield the PIP-T having the general structure (III) and the specific structure (I)

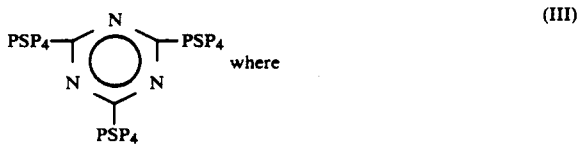
(III)

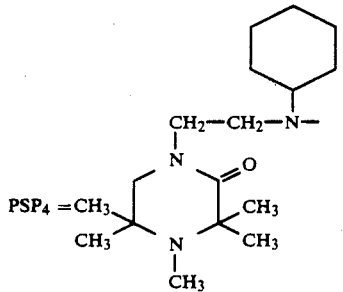

PIP-T (VIII) is alkylated with a methyl group, or a propyl group at each $N^4$ atom of each PSP in the PIP-T using a process which unexpectedly provides at least 90% conversion of the alkylated PIP-T in a reaction mass from which the alkylated PIP-T is recovered as essentially pure (at least 90% pure) crystals, as described herebelow. In the preferred embodiment, PIP-T (I) is alkylated with a methyl group to yield PIP-T (VIII).

The PIP-T (II) (or PIP-T (I)) that is alkylated as described above is dissolved in toluene and reacted with from about a 5% to about 10% molar excess of the stoichiometrically required amount of paraformaldehyde and formic acid. The reaction proceeds under reflux conditions for from about 2 to 5 hour after which the reaction mass is neutralized with aqueous ammonium hydroxide. The organic layer is washed with water and toluene is stripped from the water-washed layer to leave a concentrated solution of the alkylated PIP-T and other organic reaction products in toluene. Upon addition of heptane to the concentrated solution, the alkylated PIP-T is precipitated from solution, and recovered by filtration.

COMPONENT (C). UNALKYLATED SECONDARY AMINE PIP-T HALS (I)

Component (c), the unalkylated secondary amine PIP-T HALS (I) is known in the art. It is a specific type of an oxo-piperazinyl-triazine compound and it is specifically disclosed in U.S. Pat. No. 4,547,538, the disclosure of which is incorporated herein by reference. In the '538 reference, this compound is disclosed as FIG. (III), combined with FIG. (2C). Example 2 and Example 4 disclose a method for preparing this compound. This compound can also be made by other techniques readily available to those skilled in the art or it may be obtained from a commercial source.

PURITY OF THE COMPOSITIONS

It is important that the PIP-T HALS used in the compositions of the present invention be substantially free of compounds which destabilize acetal resins. Destabilizing impurities that are likely to occur in the PIP-T HALS that are useful in the compositions of the present invention can be assayed via (1) the pH of an aqueous suspension of 1-10 weight percent said PIP-T HALS, (2) the non-volatile ash content of the PIP-T HALS, and/or (3) the heavy metal content of the PIP-T HALS.

More specifically, it is recommended that for optimum results, the pH of an aqueous suspension (also referred to as aqueous suspension pH) 1-10 weight percent of the PIP-T HALS useful in the compositions of invention be in the range of 5-8 for homopolymer polyacetal and in the range of 5-10 for copolymer polyacetal. It is more preferred that the pH of the suspension be in the range of 5-7.5 for both homopolymer and copolymer polyacetal. It is recommended that the non-volatile ash content (ashing is conducted at greater than or equal to 800° C.) of the stabilizer be less than 0.25%, more preferably less than 0.10%, and most preferably less than 0.02%. It is also recommended that the heavy metal content of the PIP-T HALS be less than 10 ppm. For maximum thermal stability results, it is recommended that the non-volatile ash content and the heavy metal content of the PIP-T HALS be minimized.

In stabilizing ester-capped or partially ester-capped polyacetal homopolymer, the PIP-T HALS should be substantially free of basic materials which can destabilize the polyacetal. Basic impurities should preferably be removed to levels of not more than 200 ppm and most preferably to not more than 10 ppm, measured on a dry weight PIP-T HALS basis. In stabilizing polyacetal copolymer or homopolymer that is substantially all ether-capped, higher concentrations of basic materials in the PIP-T HALS can be tolerated. In addition, it should be understood that if the impurity in the PIP-T HALS is only weakly basic relatively higher amounts can be tolerated. In any event, the pH range of an aqueous suspension of the PIP-T HALS used herein should be maintained within the pH ranges described above.

In using the PIP-T HALS in both homopolymer and copolymer polyacetal, acidic impurities in the PIP-T HALS should be minimized. Acidic impurities should preferably be removed to levels of not more than 250 ppm and most preferably to not more than 10 ppm. As with the basic impurities, it should be understood that if the impurity in the PIP-T HALS is only weakly acidic, relatively higher amounts can be tolerated. In any event, the pH range of an aqueous suspension of the PIP-T HALS used herein should be maintained within the ranges described above.

Accordingly, when such acidic and/or basic impurities are present in the PIP-T HALS in amounts large enough to cause destabilization of the polyacetal compositions, the PIP-T HALS should be purified before it is introduced into compositions of the present invention. Volatile impurities in the PIP-T HALS can be removed by use of a vacuum oven. Ionic, non-volatile impurities in the PIP-T HALS can be reduced in amount by washing or extracting the PIP-T HALS with water. Non-ionic, non-volatile impurities can be reduced in amount by techniques readily available to those skilled in the art.

It should be understood that the compositions of the present invention can include, in addition to the polyacetal and the PIP-T HALS, other ingredients, modifiers and additives as are generally used in polyacetal molding resins, including thermal stabilizers, anti-oxidants, pigments, colorants, toughening agents, reinforcing agents, UV stabilizers, hindered amine stabilizers, nucleating agents, lubricants, glass fibers, and fillers. It should also be understood that some pigments and colorants can, themselves, adversely affect the stability of polyacetal compositions.

Thermal stabilizers of particular interest include polyamide stabilizers, especially nylon terpolymers, hydroxy-containing polymers such as those described in U.S. Pat. Nos. 4,766,168 and 4,814,397, and non-meltable nitrogen-containing or hydroxy-containing polymers, such as those described in co-pending U.S. patent application Ser. No. 327,665, and non-meltable naturally occurring polymers.

It has also been found that the inclusion of a mixed antioxidant system into the compositions of the present invention results in compositions in which melt processing stability and discoloration during melt processing is synergistically improved. The mixed antioxidant system is comprised of an N,N'-hexamethylene bis(3,5-di-tert-butyl-4-hydroxyhydrocinnamide) antioxidant and at least one other hindered phenol type antioxidant, such as triethyleneglycolbis(3-(3'-tert-butyl-4'-hydroxy-5'-methylphenyl) proprionate or tetrakis(methylene(3,5-di-tert-butyl-4-hydroxy-hydrocinnamate))methane. Other hindered phenol type antioxidants are known in the art.

Further, a UV absorber in combination with a PIP-T HALS useful in the compositions herein will impart a UV resistance to the composition that is superior to the UV resistance of polyacetal containing an equivalent amount of either the UV absorber or the PIP-T HALS useful herein. As such, for even further improved UV resistance, it may be advantageous to incorporate into the compositions of the present invention at least one UV absorber. UV absorbers are known and include benzotriazoles, such as 2-(3',5'-Bis(1-methyl-1-phenylethyl)-2'-hydroxyphenyl) benzotriazole; benzophenones, such as 2-Hydroxy-4-n-octoxybenzophenone; oxanilides (oxalic acid diamides), such as 2-ethoxy-5-tert-butyl-2'-ethyloxanilide and its mixture with 2-ethoxy-2'-ethyl-5,4'-di-tert-butyloxanilide; and mixtures of the above types of UV absorbers.

PREPARATION OF THE COMPOSITION

The compositions of the present invention can be prepared by mixing the PIP-T HALS with the polyacetal polymer at a temperature above the melting point of the polyacetal component of the compositions using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Kokneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing, such as valves, gates or screws designed for this purpose. Extruders are preferred. Of course, such mixing should be conducted at a temperature below which significant degradation of the polyacetal component of the composition will occur. Generally, polyacetal compositions are melt processed between 170° C. to 280° C., preferably between 185° C. to 240° C., and most preferably 195° C. to 225° C.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°–280° C., preferably 185°–240° C., most preferably 200°–230° C. When injection molding the compositions of the present invention, it is preferred that the mold be as cold as possible consistent with the intracacy of the shape being produced. Generally, the mold temperature will be 10°–120° C., preferably 10°–100° C., and most preferably about 50°–90° C.

EXAMPLES

The following are the results of tests conducted with polyacetal compositions to determine the effectiveness of the stabilizers of the present invention. Also provided are test results on polyacetal compositions containing control stabilizers, which are similar types of stabilizers that are not within the scope of the present invention. Both the stabilizers of the present invention and the control stabilizers are generically referred to in the data tables that follow as hindered amine light stabilizers, or HALS. All temperatures are in degrees Celsius unless otherwise specified. Measurements have been rounded where appropriate.

The polyacetal polymer used in the examples below was as follows:

(1) POLYACETAL "A"—an acetate end-capped homopolymer having a number average molecular weight of about 40,000.

(2) POLYACETAL "B"—acetal copolymer extracted, using methanol, from Celcon® M90-01 flake acetal copolymer.

The HALS of the present invention used in the examples below were as follows:

(1) "A" was a methylated tertiary amine PIP-T HALS having the structure (VIII).:

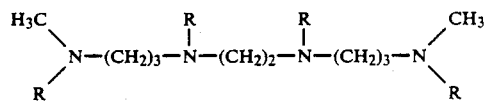

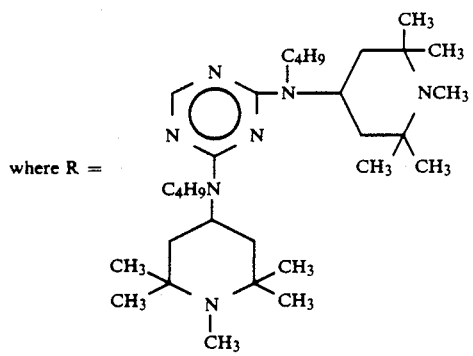

The pH of a 3.2% aqueous suspension of HALS A was about 5.8. It had an ash content of about 50 ppm, a melting point of 170°-180° C., and was 98% pure. In this HALS, the $N^4$ nitrogen in the piperazinone ring was methylated and as such, was a tertiary amine.

(2) "B" was an unalkylated secondary amine PIP-T HALS. The structure of HALS "B" was as follows:

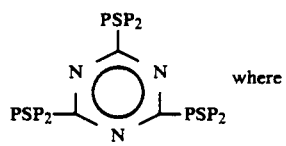
(I)

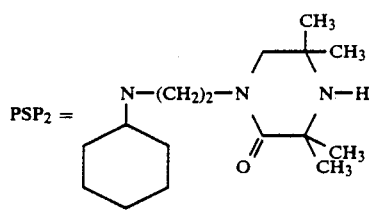

The pH of a 3.2% aqueous suspension of HALS B was about 7. In this HALS the $N^4$ nitrogen in the piperazinone ring was unalkylated and as such, was a secondary amine.

The HALS compounds used in control examples were as follows:

(1) "C1" was an unmethylated secondary amine PIP-T HALS having the same structure as HALS "B", above. The pH of a 3.2% aqueous suspension of C1 was about 9.1. In this HALS, the $N^4$ nitrogen in the piperazinone ring was unalkylated and as such, was a secondary amine.

(2) "C2" was a commercially available unalkylated secondary amine HALS containing a piperidine ring and a triazine ring. The chemical name of "C2" was poly-((6-((1,1,3,3-tetramethylbutyl)-imino)-s-triazine-2,4-diyl)(2-(2,2,6,6-tetramethylpiperidyl)-imino-hexamethylene-(4-(2,2,6,6-tetramethylpiperidyl)-imino)). It had the following structure:

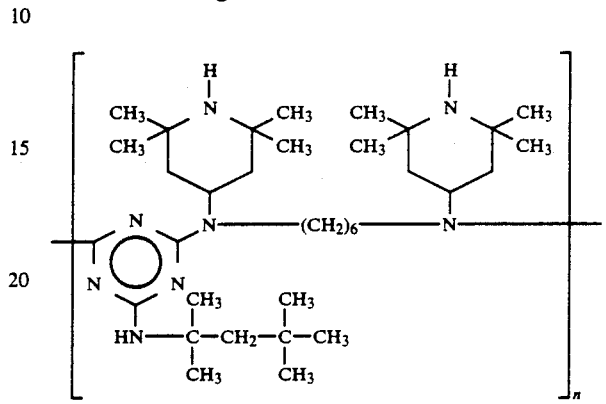

The pH of a 3.2% aqueous suspension of C2 was about 8.6. In this HALS, the $N^4$ nitrogen in the piperidine ring was unalkylated and as such, was a secondary amine. Also, there was secondary amine functionality connecting the 1,1,3,3-tetramethylbutyl group to the s-triazine ring.

(3) "C3" was a commercially available unalkylated secondary amine HALS containing a piperidine ring and an s-triazine ring. The chemical name of "C3" was poly-((6-((4-piperidone)-imino)-s-triazine-2,4-diyl)(2-(2,2,6,6-tetramethylpiperidyl)-imino-hexamethylene-(4-(2,2,6,6-tetramethylpiperidyl)-imino)). It had the following structure:

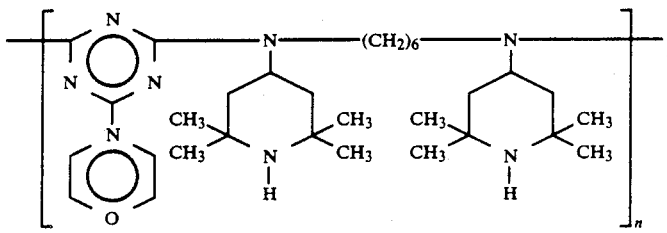

The pH of a 3.2% aqueous suspension of C3 was about 9.5. In this HALS, the $N^4$ nitrogen in the piperidine ring was unalkylated and as such, was a secondary amine. Unlike C2 and C1 (which had three secondary amine functionalities per repeat unit), C3 had only two secondary amine functionalities per repeat unit.

(4) "C4" was a commercially available methylated piperidyl-triazine HALS having the following structure:

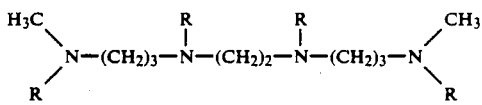

-continued where R = 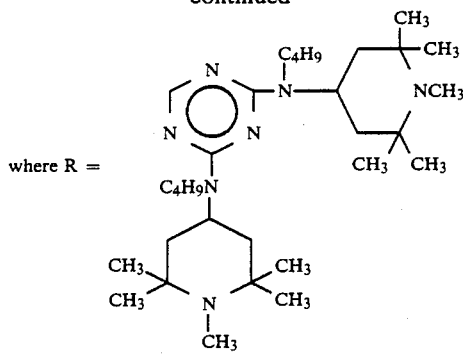

The pH of a 3.2% aqueous suspension of C4 was about 6.7. In this HALS, the $N^4$ nitrogen in the piperidine ring was methylated and as such, was a tertiary amine. All other amine functionalities in C4 were of tertiary functionalities.

Thermal stabilizers used in the examples below were as follows:

(1) THERMAL STABILIZER "A" was a nylon terpolymer.

(2) THERMAL STABILIZER "B" was an ethylene vinyl alcohol polymer.

The antioxidants used in the examples below were as follows:

(1) ANTIOXIDANT "A" was triethyleneglycol-bis(3-(3'-tert-butyl-4'-hydroxy-5'-methylphenyl) proprionate.

(2) ANTIOXIDANT "B" was N,N'-hexamethylene bis(3,5-di-tert-butyl-4-hydroxyhydrocinnamide).

(3) ANTIOXIDANT "C" was tetrakis(methylene(3,5-di-tert-butyl-4-hydroxy-hydrocinnamate))methane.

(4) ANTIOXIDANT "D" was 4,4'-butylidene-bis(6-tert-butyl-m-cresol).

The thermal stability of all the compositions tested was determined using a thermally evolved formaldehyde test procedure. A weighed sample of the polyacetal composition to be tested was placed in a tube and the tube was fitted with a cap for introduction of nitrogen to the test sample for removal of any evolved gases from the apparatus while maintaining the sample in an oxygen-free environment. The tube that contained the sample was heated at 250° C. or 259° C. in a silicone oil bath. The nitrogen and any evolved gases transported thereby were bubbled through 75 ml of a 40 g/liter sodium sulfite in water solution. Any evolved formaldehyde reacts with the sodium sulfite to liberate sodium hydroxide. The sodium hydroxide was continuously neutralized with standard 0.1N HCl. The results were obtained as a chart of ml of titer versus test time. The percent evolved formaldehyde was calculated by the formula $$(V)(N)\frac{0.03 \times 100}{SW}$$

where
V = the volume of titer in milliliters
N = the normality of the titer, and
SW = the sample weight in grams.

The factor "0.03" is the milliequivalent weight of formaldehyde in g/milliequivalent. Thermally evolved formaldehyde results are conveniently reported after fifteen minutes and after thirty minutes heating. The results are reported in the tables below under "Wt % $CH_2O$ @ x° C.".

EXAMPLES 1-10

Effect of HALS on Thermal Stability of Polyacetyl Fluff

The components of Examples 1-10 and Control examples $C_1$-$C_{14}$ are listed below in Table I and Table II. In Table I, the polyacetal used was polyacetal "A" (homopolymer) and in Table II, the polyacetal used was polyacetal "B" (copolymer). For each example, a powdered HALS was added to polyacetal fluff, shaken to mix, and tested for thermally evolved formaldehyde ($CH_2O$), as described above. The results of this test, along with observation on the appearance of the sample after thirty minutes of testing, are reported in Table I and Table II, below.

More specifically, and with reference to Table I results, it is clear that the polyacetal compositions containing the methylated tertiary amine PIP-T HALS A had the least amount of discoloration after thirty minutes of testing. It is further clear that the thermal stability, as measured by thermally evolved formaldehyde, of the polyacetal compositions of the present invention, which contained PIP-T HALS A or B, was better than the thermal stability of the polyacetal compositions containing control other HALS with secondary amine functionality. Further, polyacetal compositions containing HALS B (secondary amine functionality) showed better color retention than polyacetal compositions containing a HALS compound similar to HALS B but differing in its aqueous suspension pH (i.e. HALS C1) and than polyacetal compositions containing HALS with secondary amine functionality (i.e., HALS C2 and C3).

Also more specifically but with reference to Table II results, it is clear that the retention in color of polyacetal is best when the HALS used is the methylated tertiary amine PIP-T HALS A, even at longer test times. At test times of thirty minutes or less, HALS B is as effective as HALS A in not causing discoloration in the polyacetal. The polyacetal with either HALS A or HALS B retains it white color after thirty minutes of testing. In contrast, HALS C1, C2, and C3, all of which have secondary amine functionality at the $N^4$ position on the piperazinone or piperidine ring, all have an adverse effect on the color of the polyacetal after thirty minutes of testing.

TABLE I

| Eq. No. | Wt % PAc | Wt % HALS | Wt % $CH_2O$ @ 250° C. 15 Min | 30 Min | Appearance @ 30 Minutes |
| --- | --- | --- | --- | --- | --- |
| C1 | 100 A | — | 0.24 | 1.49 | White |
| 1 | 99.5 A | 0.5 A | 0.58 | 2.34 | White |
| 2 | 99.5 A | 0.5 B | 0.57 | 2.33 | Off-white/brown |
| C2 | 99.5 A | 0.5 C1 | 0.78 | 3.01 | Tan |
| C3 | 99.5 A | 0.5 C2 | 2.13 | 4.43 | Light tan |
| C4 | 99.5 A | 0.5 C3 | 1.50 | 2.66 | Dark tan |
| 3 | 99.0 A | 1.0 A | 0.72 | 2.48 | White |
| 4 | 99.0 A | 1.0 B | 0.58 | 2.26 | Off-white/brown |
| C5 | 99.0 A | 1.0 C1 | 0.90 | 2.68 | Dark tan |
| C6 | 99.0 A | 1.0 C2 | 2.87 | 6.68 | Light tan/spotted |

TABLE I-continued

| Eq. No. | Wt % PAc | Wt % HALS | Wt % CH₂O @ 250° C. 15 Min | Wt % CH₂O @ 250° C. 30 Min | Appearance @ 30 Minutes |
|---|---|---|---|---|---|
| C7 | 99.0 A | 1.0 C3 | 2.01 | 3.54 | Dark tan |

PAc - Polyacetal
HALS - Hindered Amine Light Stabilizer

TABLE II

| Eq. No. | Wt % PAc | Wt % HALS | Wt % CH₂O @ 250° C. 15 Min | 30 Min | 60 Min | 90 Min | Appearance @ 30 Minutes |
|---|---|---|---|---|---|---|---|
| C8 | 100 B | — | 0.01 | 0.02 | n/a | n/a | White |
| 5 | 99.5 B | 0.5 A | 0.01 | 0.03 | n/a | n/a | White |
| 6 | 99.5 B | 0.5 B | 0.02 | 0.03 | n/a | n/a | White |
| C9 | 99.5 B | 0.5 C1 | 0.01 | 0.02 | n/a | n/a | Off White/ brown |
| C10 | 99.5 B | 0.5 C2 | 0.05 | 0.16 | n/a | n/a | Tan spots |
| C11 | 99.5 B | 0.5 C3 | 0.02 | 0.02 | n/a | n/a | Light yellow |
| 7 | 99.0 B | 1.0 A | 0.01 | 0.03 | n/a | n/a | White |
| 8 | 99.0 B | 1.0 B | 0.02 | 0.02 | n/a | n/a | White |
| C12 | 99.0 B | 1.0 C1 | 0.01 | 0.03 | n/a | n/a | Dark tan |
| C13 | 99.0 B | 1.0 C2 | 0.12 | 0.26 | n/a | n/a | Light tan/ brown spots |
| C14 | 99.0 B | 1.0 C3 | 0.01 | 0.02 | n/a | n/a | Dark yellow |
| 9 | 99.0 B | 1.0 A | 0.01 | 0.03 | 0.06 | 0.11 | White @ 30, 60 + 90 minutes |
| 10 | 99.0 B | 1.0 B | 0.01 | 0.03 | 0.11 | 0.23 | White @ 30 minutes; tan @ 60 minutes; brown @ 90 minutes |

PAc = Polyacetal
HALS = Hindered Amine Light Stabilizer

EXAMPLES 11-13

Effect of HALS on Thermal Stability of Polyacetyl (melt processed)

The components of Examples 11-13 and Control Examples C15-C17 are listed below in Table III. The compositions of each example further contained the following components: 0.3% thermal stabilizer A, 0.6% thermal stabilizer B, and 0.15% antioxidant A. The samples were prepared as follows: the components were mixed together and melt compounded on a 28 mm Werner and Pfleiderer twin screw extruder with barrel temperature settings of 150 degrees Celsius to 180 degrees Celsius, die temperature settings of 200 degrees Celsius, and screw speeds of 150 rpms. The temperature of the melt as it exited the die ranged from 210 degrees Celsius to 220 degrees Celsius.

The compositions were tested for thermally evolved formaldehyde, as described above, and the appearance of the composition was noted after thirty minutes of testing. Results showed that polyacetal compositions containing the methylated tertiary amine PIP-T HALS A had better thermal stability during melt processing than did polyacetal compositions containing the unmethylated secondary amine HALS C1, which had an aqueous suspension pH greater than 9. The discoloration experienced by the polyacetal compositions with PIP-T HALS A was less than the discoloration experienced by the polyacetal compositions containing HALS C1 after thirty minutes of testing.

TABLE III

| Eq. No. | Wt % PAc | Wt % HALS | Wt % CH₂O @ 259° C. 15 Min | 30 Min | Appearance @ 30 Minutes |
|---|---|---|---|---|---|
| C15 | 98.95 A | — | 0.11 | 0.64 | Medium Yellow |
| 11 | 98.95 A | 0.3 A | 0.11 | 0.62 | Medium Yellow |
| C16 | 98.95 A | 0.3 C1 | 0.22 | 1.22 | Dark Yellow |
| 12 | 98.95 A | 0.9 A | 0.13 | 0.75 | Medium Yellow |
| C17 | 98.95 A | 0.9 C1 | 0.39 | 2.12 | Dark Tan |
| 13 | 98.95 A | 1.5 A | 0.15 | 0.85 | Medium Yellow |

PAc = Polyacetal
HALS = Hindered Amine Light Stabilizer

EXAMPLES 14-15

Effect of UV Light on Polyacetyl Containing HALS

The components for Examples 14-15 and Control Examples C18-C24 are listed in Table IVA, below. The samples were prepared as follows: the components were mixed together and melt compounded on a 28 mm Werner and Pfleiderer twin screw extruder with barrel temperature settings of 150 degrees Celsius to 180 degrees Celsius, die temperature settings of 200 degrees Celsius, and screw speeds of 150 rpms. The temperature of the melt as it exited the die ranged from 210 degrees Celsius to 220 degrees Celsius.

The samples were tested for thermally evolved formaldehyde, described above. The samples were also tested to determine weight loss after UV exposure. Samples for the weight loss after UV exposure test were molded plaques having dimensions of 5 cm × 8.1 cm × 4 mm. The molded plaques weighed between 21.9 to 22.5 grams and the surface finish of said plaques was a textured surface resembling automotive vinyl. The textured side of the plaque was exposed to a UV light source at a prescribed amount (i.e., 100, 200, or 300 kJ/m², as specified in Table IVB, below). All samples were subjected to UV exposure in the same apparatus, operated under the same conditions. Samples from each example were run simultaneously to eliminate test variation errors. Samples were weighed prior to testing. The samples were all subjected to accelerated UV exposure in an Atlas Ci65 Xenon Arc Weatherometer, operated as per SAE J1885 (Automotive Interior Conditions), with a quartz inner filter and a borosilicate outer filter. Pertinent details of the SAE J1885 method appear directly below as follows:

|  | Light Cycle | Dark Cycle |
|---|---|---|
| Irradiance (Watt/m²) | 0.55 | — |
| Black Panel Temp (°C.) | 89 | 38 |
| Relative Humidity (%) | 50 | 100 |
| Cycle Time (hours) | 3.8 | 1.0 |

The calculation of sample exposure in terms of irradiation is as follows:

$$0.55 \text{ W/m}^2 = 0.55 \text{ J/(m}^2-\text{s)}$$

$$0.55 \times 10^{-3} \text{ kJ (m}^2-\text{s)} \times (3600 \text{ s})/(1 \text{ light hour}) = 1.98 \text{ kJ/m}^2 \text{ per light hour}$$

where W=watt, m²=meter squared, J=Joule, s=second, kJ=kilojoule.

Weight loss after UV exposure at the prescribed amount detailed in Table IVB, below was determined by weighing the sample after exposure to UV light at the prescribed amount and then calculating percent weight loss by the following formula:

$$((\text{unexposed sample weight}) - (\text{exposed sample weight}))/(\text{unexposed sample weight}) \times 100\%.$$

Weight loss is a standard test for studying polyacetal UV degradation.

The data reported in Table IVA, below, showed that at 1% loading, the polyacetal composition containing methylated tertiary amine PIP-T HALS A had better thermal stability, measured by thermally evolved formaldehyde, than did a polyacetal composition containing the unmethylated secondary amine PIP-T HALS C1 having an aqueous suspension pH greater than 9 or the methylated piperidinyl-triazine HALS C4.

At a 0.5% HALS loading, the polyacetal composition containing the methylated tertiary PIP-T HALS A had about equivalent thermal stability, measured by the thermally evolved formaldehyde test, as did the polyacetal composition containing the methylated piperidyl-triazine HALS C4. However, the compositions differed significantly upon exposure to UV light, as described above. The results for this test are reported in Table IVB, below. Specifically, the polyacetal composition with the methylated piperidyl-triazine HALS C4 suffered a weight loss twice as great as that experienced by the polyacetal composition containing the methylated tertiary PIP-T HALS A of the present invention, at an exposure of 300 kJ/m². Further, the physical appearance of the polyacetal composition containing the methylated piperidyl-triazine HALS C4 was deteriorated in comparison to the physical appearance of the polyacetal composition containing the methylated tertiary amine PIP-T HALS A. Also, the physical appearance of the polyacetal compositions containing HALS A was much better than those containing HALS C1, the unmethylated secondary amine PIP-T HALS having an aqueous suspension pH greater than 9).

TABLE IVA

| Eq. No. | Wt % PAc | Wt % HALS | Wt % CH₂O @ 259° C. 15 Min | 30 Min |
|---|---|---|---|---|
| C18 | 100 A | — | 1.07 | 2.57 |
| 14 | 99.5 A | 0.5 A | 1.13 | 3.24 |
| C19 | 99.5 A | 0.5 C1 | 1.59 | 5.90 |
| C20 | 99.5 A | 0.5 C2 | 2.95 | 5.42 |
| C21 | 99.5 A | 0.5 C3 | 2.54 | 4.95 |

TABLE IVA-continued

| Eq. No. | Wt % PAc | Wt % HALS | Wt % CH₂O @ 259° C. 15 Min | 30 Min |
|---|---|---|---|---|
| C22 | 99.5 A | 0.5 C4 | 1.14 | 3.01 |
| 15 | 99.0 A | 1.0 A | 0.61 | 2.60 |
| C23 | 99.0 A | 1.0 C1 | 2.03 | 6.56 |
| C24 | 99.0 A | 1.0 C4 | 1.72 | 3.65 |

PAc = Polyacetal
HALS = Hindered Amine Light Stabilizer

TABLE IVB

| Eq. No. | Wt % PAC | Wt % HALS | Wt Loss After UV Exposure | | | Appearance | | |
|---|---|---|---|---|---|---|---|---|
| | | | 100 kJ/m² | 200 kJ/m² | 300 kJ/m² | 100 kJ/m² | 200 kJ/m² | 300 kJ/m² |
| C18 | 100 A | — | 0.61 | 1.56 | 4.31 | chalked | moderately chalked | heavily chalked |
| 14 | 99.5 A | 0.5 A | 0.04 | 0.14 | 0.32 | — | — | I |
| C19 | 99.5 A | 0.5 C1 | 0.07 | 0.18 | 0.36 | — | — | I, V |
| C20 | 99.5 A | 0.5 C2 | 0.37 | 0.72 | 1.19 | V | II, V | III, V |
| C21 | 99.5 A | 0.5 C3 | 0.34 | 0.71 | 1.68 | V | II, V | IV, V |
| C22 | 99.5 A | 0.5 C4 | 0.10 | 0.19 | 0.77 | — | I, V | III, V |
| 15 | 99.0 A | 1.0 A | 0.05 | 0.16 | 0.36 | — | — | I |
| C23 | 99.0 A | 1.0 C1 | 0.09 | 0.35 | 1.71 | — | I, V | III, V |
| C24 | 99.0 A | 1.0 C4 | 0.10 | 0.26 | 0.75 | — | V | III, V |

PAc = Polyacetal
HALS = Hindered Amine Light Stabilizer
Appearance Codes:
plaques were examined using 7× magnification
I = crazed - hairline cracking as a continuous line, no fissure evident
II = lightly cracked, two sides of the crack separated by narrow fissure
III = moderately cracked, cracks with fissures visible to the naked eye, confirmed under magnification
IV = Very heavily cracked; extremely visibly to the naked eye
V = edge cracking, cracks on edges of plaque clearly visible to the naked eye

EXAMPLES 16-18

Effect of HALS On Polyacetal Aging

The components of Examples 16-18 and Control Examples C25-C28 are listed below in Table V. Additionally, the compositions each contained polyacetal A, 0.5% of a polyethylene-glycol lubricant, 0.13% of antioxidant C, 0.6% of a benzotriazole-type UV absorber, 0.25% of thermal stabilizer A, and 0.75% of thermal stabilizer B. The sample compositions were prepared as follows: all components were mixed together and melt compounded on a two and one-half inch Sterling single screw extruder with barrel temperature settings ranging from 120 degrees Celsius to 180 degrees Celsius, die temperature settings of 200 degree Celsius, and screw speeds of 150 rpms. The temperature of the melt as it exited the die ranged from 210 degrees Celsius to 220 degrees Celsius.

Samples were tested for thermally evolved formaldehyde, as described above.

Samples were also subjected to air oven aging studies. For the air oven aging studies, the melt compounded samples were molded into ⅛ inch thick tensile bars. The tensile bars for each composition were preweighed and placed in a circulating air oven at 130 degrees Celsius for the times noted in Table V, below. Oven location effects were averaged by distributing bars of a sample throughout the oven. At the end of the specified time period, the tensile bars were removed from the oven, weighed, and tested for tensile strength and elongation according to ASTM Method D-638 (0.2 in/min crosshead speed). The percent weight loss was calculated as $(1 - ((\text{weight after aging})/(\text{weight before aging}))) \times 100$.

The results in Table V, below, show that weight loss after 20 and 40 days is significantly less, and physical properties are better retained, for polyacetal compositions containing the methylated tertiary amine PIP-T HALS A than for polyacetal compositions containing the methylated piperidyl triazine HALS C4.

TABLE V

| No. | Wt % HALS | Wt % UV Absorber | Wt % CH$_2$O @ 259° C. 15 Min | Wt % CH$_2$O @ 259° C. 30 Min | Air Oven Aging @ 130° C. 0 Days % E | Air Oven Aging @ 130° C. 0 Days TS | Air Oven Aging @ 130° C. 20 Days Wt. Loss | Air Oven Aging @ 130° C. 20 Days % E | Air Oven Aging @ 130° C. 20 Days % TS | Air Oven Aging @ 130° C. 40 Days Wt. Loss | Air Oven Aging @ 130° C. 40 Days % E | Air Oven Aging @ 130° C. 40 Days % TS |
|---|---|---|---|---|---|---|---|---|---|---|---|---|
| C25 | — | — | 0.11 | 0.40 | 36.2 | 9.5 | 0.51 | 5.0 | 9.1 | 1.33 | 2.5 | 7.1 |
| 16 | 0.15 A | 0.15 A | 0.12 | 0.44 | 53.3 | 8.9 | 0.49 | 17.9 | 10.4 | 1.06 | 2.7 | 6.6 |
| C26 | 0.15 C4 | 0.15 A | 0.06 | 0.32 | 47.2 | 9.2 | 1.05 | 2.6 | 6.5 | 2.94 | 2.3 | 5.8 |
| 17 | 0.3 A | 0.3 A | 0.07 | 0.44 | 33.3 | 9.2 | 0.33 | 18.8 | 10.4 | 1.03 | 2.3 | 6.8 |
| C27 | 0.3 C4 | 0.3 A | 0.18 | 0.57 | 38.0 | 9.3 | 1.03 | 2.1 | 6.1 | 3.25 | 1.5 | 5.1 |
| 18 | 0.6 A | 0.6 A | 0.15 | 0.54 | 32.1 | 9.2 | 0.56 | 19.1 | 10.4 | 1.00 | 1.9 | 6.3 |
| C28 | 0.6 C4 | 0.6 A | 0.10 | 0.49 | 43.0 | 9.1 | 1.30 | 1.9 | 6.0 | 3.66 | 1.5 | 4.0 |

HALS = Hindered Amine Light Stabilizer
*units of tensile strength = kpsi

EXAMPLES 19-20

Effect of HALS On Polyacetal Color

The components of Examples 19-20 and Control Examples C29-C31 are disclosed in Table VIA and Table VIB, below. In addition, the compositions in Table VIA contained polyacetal A, 0.75% thermal stabilizer B, 0.25% thermal stabilizer A, 0.13% antioxidant C, 0.5% of a polyethylene-glycol lubricant, 0.6% of a benzotriazole-type UV absorber, 0.6% of the HALS specified in Table VIA, and 0.2% of a deep blue pigment mixture, the major component of which was ultramarine blue, with minor shadings of a pthalocyanine green and carbon black. The compositions in Table VIB additionally contained polyacetal B, 0.6% thermal stabilizer B, 0.3% thermal stabilizer A, 0.3% of the HALS specified in Table VIB. and 0.3% of an organic azocondensation red pigment (C.I. pigment red 220).

The samples were tested to determine the effect that the HALS has on the color of the sample (in other words, to determine the color fastness of the polyacetal composition). This effect was measured by the Color Difference Calculations method. The Color Difference Method is an instrumental means of color grading. It is noted that it is not as sensitive as the human eye and therefore, the final judgment criteria is usually visual assessment. The instrument used was a Macbeth 1500/Plus Color Measurement System, which gives color difference calculation measurements as per SAE J1545, which employs CIELAB color space, a D65 illuminant, and a 10 degree observer with specular reflectance included. Plaques of the sample composition were prepared as described above for the "weight loss after UV exposure" test. Samples were tested in the weatherometer, as above. Sample plaques were placed in holders and hung from racks around the UV lamp. Samples plaques were removed from the weatherometer. Color differences were measured and compared for an unexposed sample plaque and the exposed sample plaque. After measurements were made on the exposed sample plaque, the plaque was wiped with a tissue to remove surface film and was then remeasured. Samples that were "wiped" are referred to in Table VIA, below, as "wiped" samples. Exposed samples that were not "wiped" are referred to in Table VIA, below as "unwiped" samples Plaques were wiped because the film formed on the surface could interfere with color difference measurements.

The color difference calculation measurements data obtained from this test was as follows:

Delta L—change in lightness; (−)=dark shift and (+)=light shift;
Delta a—green or red shift; (−)=green shift and (+)=red shift;
Delta b—blue or yellow shift; (−)=blue shift and (+)=yellow shift;
Delta E—total color difference=square root of the sum of delta L squared+delta a squared+delta b squared.

Ideally, one would want the color difference to be zero. The instrument used in taking such measurements is calibrated before any measurements are performed.

In Table VIA. below, data is presented showing that the overall color change (delta E) experienced by a polyacetal composition containing the methylated tertiary amine PIP-T HALS A of the present invention (wiped or unwiped sample) was, at 1240.8 kJ/m$^2$, at least four times less than that experienced by a polyacetal composition containing the methylated piperdinyl-triazine HALS C4.

In Table VIB, below, data is presented showing that the overall color change (delta E) of a pigmented polyacetal composition was improved with the methylated tertiary amine PIP-T HALS A. Further, it also show that the unalkylated secondary amine PIP-T HALS C1 was effective in reducing color changes. However, PIP-T HALS C1 has been show to cause discoloration during melt processing (Table I).

TABLE VIA

| Eq. No. | HALS | DELTA E 300 kJ/m$^2$ | DELTA E 600 kJ/m$^2$ | DELTA E 900 kJ/m$^2$ | DELTA E 1240.8 kJ/m$^2$ |
|---|---|---|---|---|---|
| 19A unwiped | A | 0.89 | 0.92 | 2.69 | 2.93 |
| C29A unwiped | C4 | 1.90 | 7.95 | 13.07 | 12.96 |
| 19B wiped | A | 0.33 | 0.58 | 2.45 | 4.06 |
| C29B wiped | C4 | 1.87 | 9.37 | 15.22 | 18.70 |

HALS = Hindered Amine Light Stabilizer

TABLE VIB

| Eg. No. | HALS | Delta E @ 400 kJ/m$^2$ |
|---|---|---|
| C30 | — | 27.91 |
| 20 | A | 11.01 |
| C31 | C1 | 10.05 |

EXAMPLES 21-23.

Effect Of Mixed Antioxidant and HALS On Polyacetal Stability

The components for Examples 21-23 and Control Examples C32-C37 are listed below in Table VII. Additionally, the compositions contained polyacetal B, 0.6% thermal stabilizer A, and 0.3% thermal stabilizer B. The results show that discoloration is synergistically improved when there is included in the composition of the present a mixed antioxidant combination (compare Example 21 with 22 and 23).

TABLE VII

| Eq. No. | Wt % HALS | Wt % AO1 | Wt % AO2 | Wt % $CH_2O$ @ 259° C. 15 Min | 30 Min | Appearance @ 30 Minutes |
|---|---|---|---|---|---|---|
| C32 | — | 0.15 A | — | 0.11 | 0.64 | Medium yellow |
| 21 | 0.3 A | 0.15 A | — | 0.11 | 0.62 | Medium yellow |
| C33 | 0.3 C1 | 0.15 A | — | 0.22 | 1.22 | Dark yellow |
| C34 | — | 0.15 B | — | 0.08 | 0.54 | Medium yellow |
| 22 | 0.3 A | 0.15 B | — | 0.09 | 0.61 | Medium yellow |
| C35 | 0.3 C1 | 0.15 B | — | 0.19 | 1.10 | Medium dark yellow |
| C36 | 0 | 0.075 A | 0.075 B | 0.09 | 0.53 | Light yellow |
| 23 | 0.3 A | 0.075 A | 0.075 B | 0.09 | 0.53 | Light yellow |
| C37 | 0.3 C1 | 0.075 A | 0.075 B | 0.17 | 0.97 | Medium dark yellow |

HALS = Hindered Amine Light Stabilizer
AO = Antioxidant

I claim:

1. A composition consisting essentially of
   (a) 95.0 to 99.95 weight percent of a polyacetal polymer and
   (b) 0.05 to 5.0 weight percent of a hindered amine light stabilizer having the structure

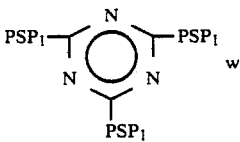

(II)

wherein A represents $C_1$-$C_3$ alkyl; $R_1$, $R_2$, $R_3$, and $R_4$ each independently represent $C_1$-$C_6$ alkyl, or, when together cyclized, $R_1$ and $R_2$, and $R_3$ with $R_4$, represent $C_5$-$C_7$ cycloalkyl; $R_5$ represents $C_1$-$C_6$ alkyl, $C_5$-$C_7$ cycloalkyl, $C_7$-$C_{12}$ aralkyl, hydrogen, and phenyl; $R_6$ represents $C_1$-$C_{12}$ alkyl and $C_5$-$C_{12}$ cycloalkyl; and, p represents an integer in the range from 2 to about 12;
provided that the component (b) hindered amine light stabilizer has a pH of 5-10, as measured on a 1-10 weight percent aqueous suspension thereof, and wherein the above-stated weight percents are based upon the weight of components (a) and (b) only.

2. The composition of claim 1 wherein the component (a) polyacetal is a homopolymer and the pH of the component (b) hindered amine light stabilizer is 5.8.

3. The composition of claim 1 wherein the component (a) polyacetal is a copolymer.

4. The composition of claims 1, 2, or 3 wherein A of component (b) is a methyl group.

5. The composition of claims 1, 2 or 3 wherein is component (b), $R^1$, $R_2$, $R_3$, and $R_4$ are each methyl and A is methyl.

6. The composition of claims 1, 2, or 3 wherein component (b) has the structure (VIII)

7. A composition consisting essentially of
   (a) 95.0 to 99.95 weight percent of a polyacetal homopolymer and
   (b) 0.05 to 5.0 weight percent of a hindered amine light stabilizer having the structure (I)

wherein the above stated weight percents are based upon the weight of components (a) and (b) only and provided that the component (b) hindered amine light stabilizer has a pH of 5-8, as measured on a 1-10 weight percent aqueous suspension thereof.

8. A composition consisting essentially of
   (a) 95.0 to 99.95 weight percent of a polyacetal copolymer and
   (b) 0.05 to 5.0 weight percent of a hindered amine light stabilizer having the structure (I)

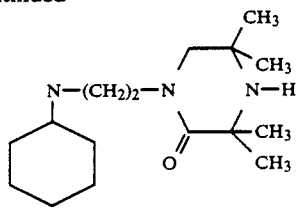

wherein the above-stated weight percents are based upon the weight of components (a) and (b) only and provided that the component (b) hindered amine light stabilizer has a pH of 5-10, as measured on a 1-10 weight percent aqueous suspension thereof.

9. The composition of claims 1, 2,3, 7, or 8 further comprising at least one of thermal stabilizers, antioxidants, pigments, colorants, toughening agents, reinforcing agents, UV stabilizers, hindered amine stabilizers, nucleating agents, lubricants, glass fibers, and fillers.

10. The composition of claim 9 wherein the thermal stabilizer is selected from polyamides, meltable hydroxy-containing compounds, non-meltable hydroxy containing compounds, meltable nitrogen containing compounds, non-meltable nitrogen containing compounds, and mixtures thereof.

11. The composition of claims 1, 7, or 8 further comprising an antioxidant mixture comprised of N,N'-hexamethylene bis(3,5-di-tert-butyl-4-hydroxy-hydrocinnamide and at least one hindered phenol type antioxidant.

12. The composition of claims 1, 7, or 8 further comprising an ultraviolet absorber selected from the class consisting of benzotriazole-based UV absorbers, benzophenone-based UV absorbers, oxanilide-based UV absorbers, and mixtures thereof.

13. Shaped articles made from the compositions of claims 1, 7, or 8.

* * * * *